United States Patent
Tsai et al.

(10) Patent No.: US 8,324,871 B2
(45) Date of Patent: Dec. 4, 2012

(54) INTEGRATED MULTI-INDUCTOR MAGNETIC MEMBER AND MULTI-LOOP POWER FACTOR CORRECTION CIRCUIT HAVING SAME

(75) Inventors: Hsin-Wei Tsai, Taoyuan Hsien (TW); Shih-Hsien Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 272 days.

(21) Appl. No.: 12/948,563

(22) Filed: Nov. 17, 2010

(65) Prior Publication Data
US 2011/0116292 A1    May 19, 2011

(30) Foreign Application Priority Data
Nov. 19, 2009   (TW) ................................ 98139399 A

(51) Int. Cl.
*G05F 1/70*   (2006.01)

(52) U.S. Cl. .......................... 323/207; 323/222; 323/272

(58) Field of Classification Search .................. 323/207, 323/222, 272, 247
See application file for complete search history.

(56) References Cited

U.S. PATENT DOCUMENTS 8,248,040 B2 *   8/2012   Rausch et al. ................ 323/207

* cited by examiner

*Primary Examiner* — Shawn Riley
(74) *Attorney, Agent, or Firm* — Kirton McConkie; Evan R. Witt

(57) ABSTRACT

A multi-loop power factor correction circuit includes a first rectifier circuit, an integrated multi-inductor magnetic member, plural switching circuits, plural rectifying elements, and a power factor correction controlling circuit. The integrated multi-inductor magnetic member includes a first slab, a second slab, a middle post, plural lateral posts, and plural winding coil assemblies. The winding coil assemblies are wound around respective lateral posts to form at least a first inductor and a second inductor. The magnetic flux cross-section area of the middle post is smaller than the sum of the magnetic flux cross-section areas of the lateral posts. The switching circuits are alternately conducted, so that the distribution of an input AC current is similar to the waveform of the input AC voltage.

20 Claims, 6 Drawing Sheets

INTEGRATED MULTI-INDUCTOR MAGNETIC MEMBER AND MULTI-LOOP POWER FACTOR CORRECTION CIRCUIT HAVING SAME

FIELD OF THE INVENTION

The present invention relates to a magnetic member, and more particularly to an integrated multi-inductor magnetic member. The present invention also relates to a multi-loop power factor correction circuit having the integrated multi-inductor magnetic member.

BACKGROUND OF THE INVENTION

With increasing industrial development, diverse electronic devices are used to achieve various purposes. An electronic device comprises a plurality of electronic components. Generally, different kinds of electronic components are operated by using different voltages.

As known, a power supply is essential for many electronic devices such as personal computers, industrial computers, servers, communication products or network products. Usually, the user may simply plug a power supply into an AC wall outlet commonly found in most homes or offices so as to receive an AC voltage. The power supply will convert the AC voltage into a regulated DC output voltage for powering the electronic device. The regulated DC output voltage is transmitted to the electronic device through a power cable. Since different electronic devices have different power consumption magnitudes, the power factors indicative of the efficiency of utility power are usually different.

For increasing the efficiency of utility power, an additional power factor correction circuit is included in the electronic device in order to increase the power factor. Moreover, a multi-loop power factor correction circuit is used in high-power electronic device in order to achieve a better power factor correction function. Although the multi-loop power factor correction circuit is effective for increasing power factor, the overall volume of the electronic device is increased, which is detrimental to minimization of the electronic device. In addition, the utilization of the magnetic element used in the multi-loop power factor correction circuit is usually unsatisfied. In a case that the winding window of the magnetic element is beyond an acceptable range, only the magnetic core size, the diameter of the winding coil, the turn number of the winding coil or the copper slice thickness may be adjusted. In some situations, many magnetic elements are required. Too many magnetic elements occupy the layout space and are not cost-effective.

SUMMARY OF THE INVENTION

It is an object of the present invention to provide a multi-loop power factor correction circuit having the integrated multi-inductor magnetic member. The multi-loop power factor correction circuit may be applied to a high-power electronic device. The use of the integrated multi-inductor magnetic member is effective for reducing eddy loss, increasing heat-dissipating efficiency and reducing the overall volume of the electronic device.

In accordance with an aspect of the present invention, there is provided a multi-loop power factor correction circuit. The multi-loop power factor correction circuit includes a first rectifier circuit, an integrated multi-inductor magnetic member, plural switching circuits, plural rectifying elements, and a power factor correction controlling circuit. The first rectifier circuit is used for rectifying an input AC voltage into a rectified voltage. The integrated multi-inductor magnetic member includes a first slab, a second slab, a middle post between the first slab and the second slab, plural lateral posts between the first slab and the second slab, and plural winding coil assemblies. The winding coil assemblies are wound around respective lateral posts to form at least a first inductor and a second inductor. A first terminal of the first inductor and a first terminal of the second inductor are connected to the first rectifier circuit. A second terminal of the first inductor and the second terminal of the second inductor are respectively connected to a first connecting node and a second connecting node. The magnetic flux cross-section area of the middle post is smaller than the sum of the magnetic flux cross-section areas of the lateral posts. The plural switching circuits include at least a first switching circuit and a second switching circuit. The first switching circuit and the second switching circuit are respectively connected to the first connecting node and the second connecting node. The plural rectifying elements include at least a first rectifying element and a second rectifying element. The first rectifying element is interconnected between the first connecting node and a power output terminal. The second rectifying element is interconnected between the second connecting node and power output terminal. The power factor correction controlling circuit is connected to a common terminal, the first rectifier circuit and control terminals of the switching circuits. The switching circuits are alternately conducted, so that the distribution of an input AC current is similar to the waveform of the input AC voltage.

In accordance with another aspect of the present invention, there is provided an integrated multi-inductor magnetic member for use in a multi-loop power factor correction circuit. The integrated multi-inductor magnetic member includes a first slab, a second slab, a middle post, plural lateral posts, and plural winding coil assemblies. The middle post is arranged between the first slab and the second slab. The plural lateral posts are arranged between the first slab and the second slab. The magnetic flux cross-section area of the middle post is smaller than the sum of the magnetic flux cross-section areas of the lateral posts. The plural winding coil assemblies are wound around respective lateral posts to form at least a first inductor and a second inductor. The first inductor and the second inductor are respectively included in a first loop and second loop of the multi-loop power factor correction circuit. The first inductor and the second inductor are alternately charged during operation of the multi-loop power factor correction circuit.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
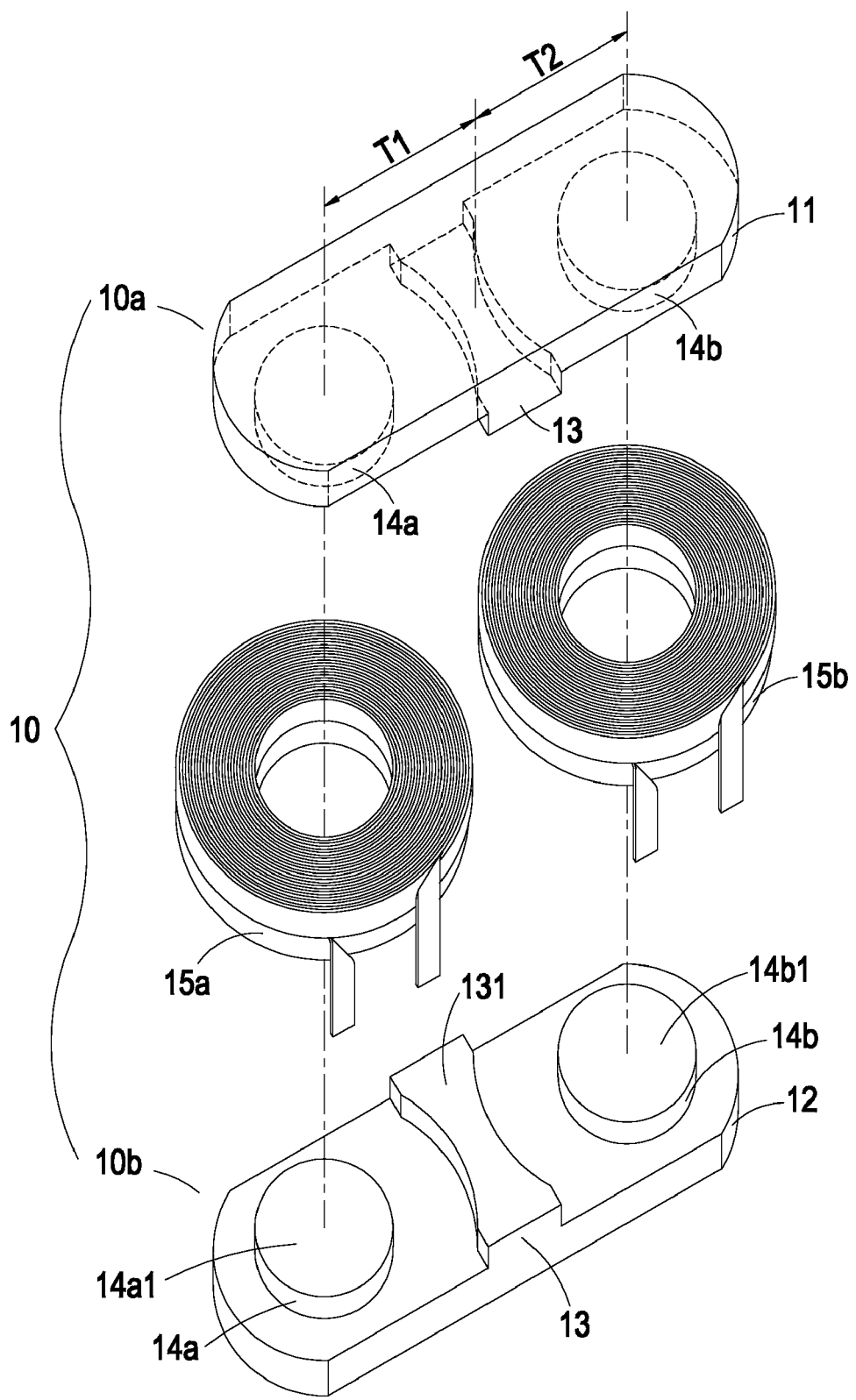
FIG. 1A is a schematic exploded view illustrating an integrated multi-inductor magnetic member according to an embodiment of the present invention.
Figure 1B:
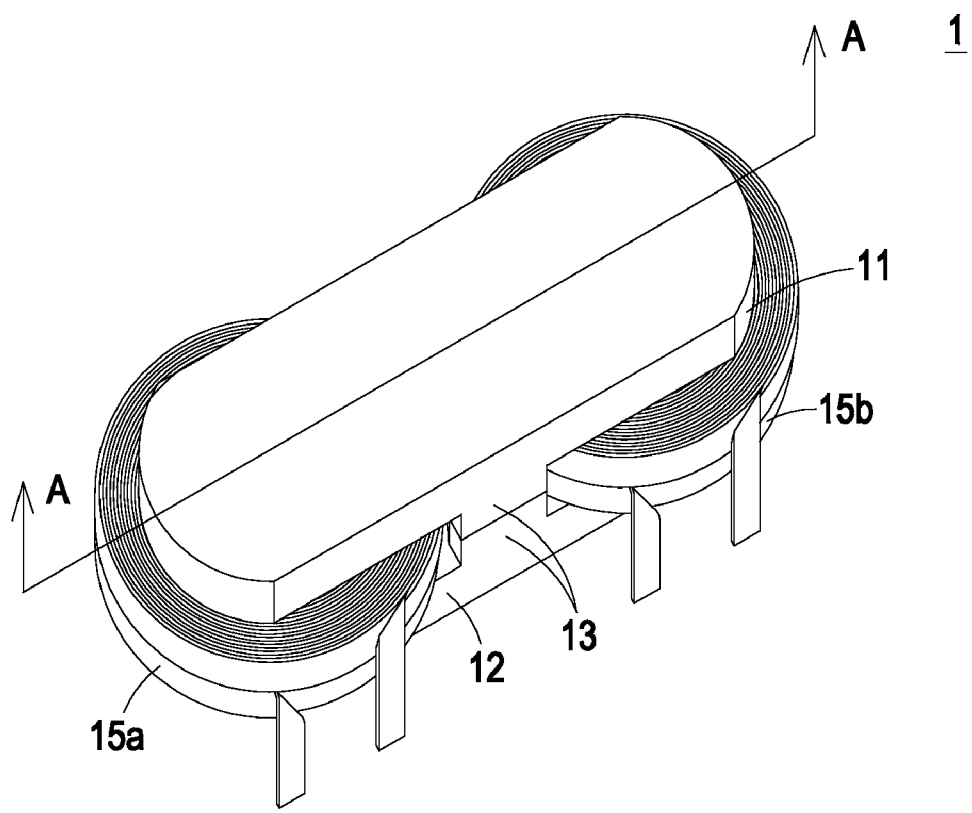
FIG. 1B is a schematic assembled view illustrating the integrated multi-inductor magnetic member of FIG. 1A.
Figure 1C:
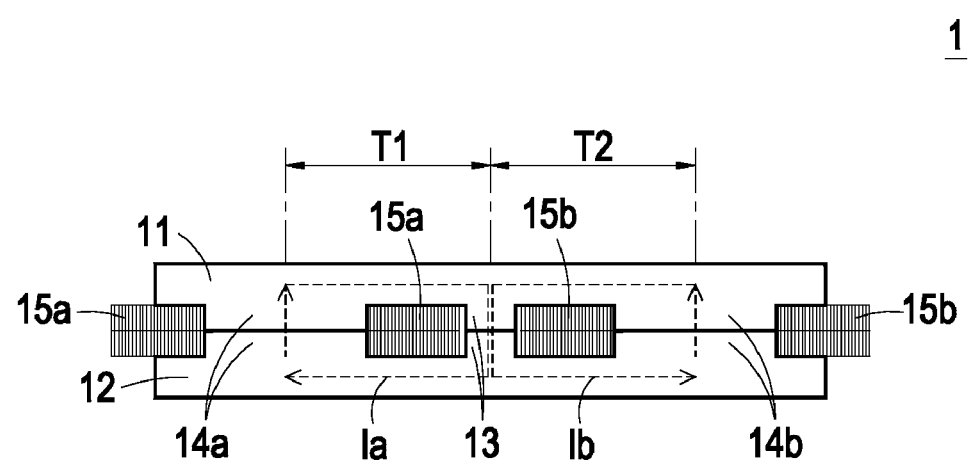
FIG. 1C is a schematic cutaway view illustrating the integrated multi-inductor magnetic member of FIG. 1B and taken along the line A-A.
Figure 2:
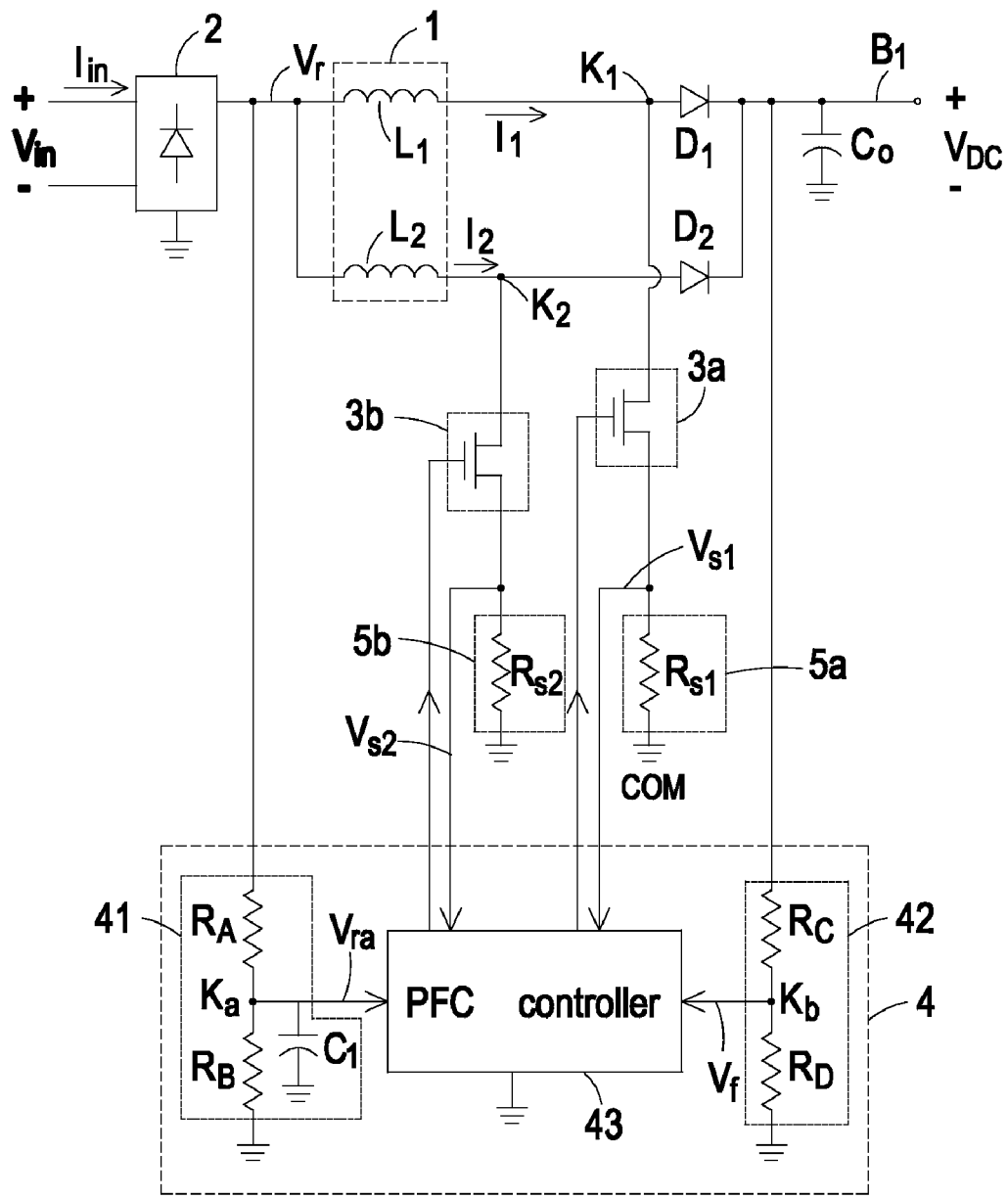
FIG. 2 is a schematic circuit diagram illustrating a multi-loop power factor correction circuit having an integrated multi-inductor magnetic member according to an embodiment of the present invention.

FIG. 1A is a schematic exploded view illustrating an integrated multi-inductor magnetic member according to an embodiment of the present invention. FIG. 1B is a schematic assembled view illustrating the integrated multi-inductor magnetic member of FIG. 1A. FIG. 1C is a schematic cut-away view illustrating the integrated multi-inductor magnetic member of FIG. 1B and taken along the line A-A. Please refer to FIGS. 1A, 1B and 1C. The integrated multi-inductor magnetic member 1 comprises a first slab 11, a second slab 12, a middle post 13, a first lateral post 14a, a second lateral post 14b, a first winding coil assembly 15a and a second winding coil assembly 15b. The first slab 11, the second slab 12, the middle post 13, the first lateral post 14a and the second lateral post 14b are made of magnetic material. The first slab 11, the second slab 12, the middle post 13, the first lateral post 14a and the second lateral post 14b are collectively assembled into a magnetic core assembly 10. As a consequence, a magnetic path is established in the magnetic core assembly in order to store magnetic energy. The first lateral post 14a, the second lateral post 14b and the middle post 13 arranged at different positions with respect to the first slab 11 and the second slab 12. The first winding coil assembly 15a and the second winding coil assembly 15b have the same turn numbers. The first winding coil assembly 15a is wound around the first lateral post 14a to define a first inductor $L_1$. The second winding coil assembly 15b is wound around the second lateral post 14b to define a second inductor $L_2$. The first inductor $L_1$ and the second inductor $L_2$ have the same inductance values (as shown in FIG. 2).

In this embodiment, each of the first winding coil assembly 15a and the second winding coil assembly 15b is produced by winding a flat copper coil, which has been subject to surface insulation treatment. Alternatively, each of the first winding coil assembly 15a and the second winding coil assembly 15b is produced by winding a circular copper coil. Provided that the turn number is identical, the flat copper coil has smaller volume than the circular copper coil.

Since the first inductor $L_1$ and the second inductor $L_2$ are not simultaneously charged, the magnetic flux cross-section area 131 of the middle post 13 is not greater than or equal to the sum of the magnetic flux cross-section area 14a1 of the first lateral post 14a and the magnetic flux cross-section area 14b1 of the second lateral post 14b. On the other hand, the magnetic flux cross-section area 131 of the middle post 13 is smaller than the sum of the magnetic flux cross-section area 14a1 of the first lateral post 14a and the magnetic flux cross-section area 14b1 of the second lateral post 14b. As a consequence, the integrated multi-inductor magnetic member 1 has reduced volume while maintaining its inductance value. In this embodiment, the magnetic flux cross-section area 14a1 of the first lateral post 14a, the magnetic flux cross-section area 14b1 of the second lateral post 14b and the magnetic flux cross-section area 131 of the middle post 13 are identical. In some embodiments, the magnetic flux cross-section area 131 of the middle post 13 is 1~1.2 times of the magnetic flux cross-section area 14a1 of the first lateral post 14a or 1~1.2 times of the magnetic flux cross-section area 14b1 of the second lateral post 14b. In other words, the magnetic flux cross-section area 131 of the middle post 13 is slightly greater than the magnetic flux cross-section area 14a1 of the first lateral post 14a and the magnetic flux cross-section area 14b1 of the second lateral post 14b.

In this embodiment, each of the middle post 13, the first lateral post 14a and the second lateral post 14b comprises an upper portion and a lower portion. The upper portions of the middle post 13, the first lateral post 14a, the second lateral post 14b and the first slab 11 are integrated into an E-shaped first magnetic core 10a. The lower portions of the middle post 13, the first lateral post 14a, the second lateral post 14b and the second slab 11 are integrated into an E-shaped second magnetic core 10b. After the first magnetic core 10a and the second magnetic core 10b are combined together via an adhesive, the magnetic core assembly 10 is assembled (see FIG. 1B). In this embodiment, a first distance $T_1$ between the middle post 13 and the first lateral post 14a is substantially equal to a second distance $T_2$ between the middle post 13 and the second lateral post 14b. That is, the distances of all lateral posts relative to the middle post 13 are identical. A first magnetic path 1a of the first inductor $L_1$ defined by a portion of the first slab 11, a portion of the second slab 12, the middle post 13 and the first lateral post 14a is the same as a second magnetic path 1b of the second inductor $L_2$ defined by a portion of the first slab 11, a portion of the second slab 12, the middle post 13 and the second lateral post 14b (see FIG. 1C).

Figure 1D:
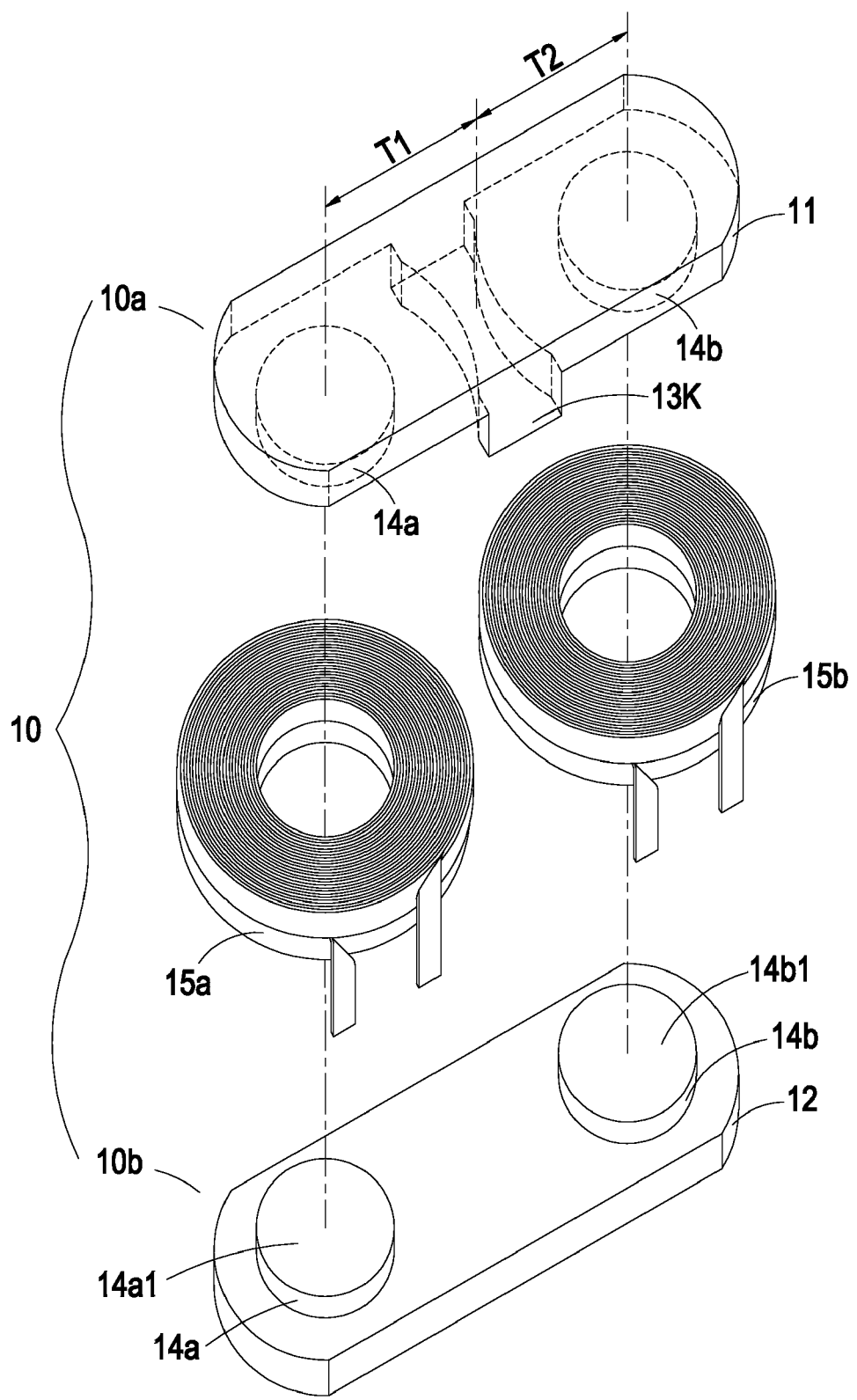
FIG. 1D is a schematic exploded view illustrating an integrated multi-inductor magnetic member according to another embodiment of the present invention.

FIG. 1D is a schematic exploded view illustrating an integrated multi-inductor magnetic member according to another embodiment of the present invention. Component parts and elements corresponding to those of FIG. 1A are designated by identical numeral references, and detailed description thereof is omitted. In comparison with FIG. 1A, the middle post 13K of the integrated multi-inductor magnetic member of FIG. 1D is an integral post. The middle post 13K, the upper portion of the first lateral post 14a, the upper portion of the second lateral post 14b and the first slab 11 are integrated into an "山"-shaped first magnetic core 10a. The lower portion of the first lateral post 14a, the lower portion of the second lateral post 14b and the second slab 12 are integrated into a U-shaped second magnetic core 10b. After the first magnetic core 10a and the second magnetic core 10b are combined together via an adhesive, a magnetic core assembly 10 is assembled (not shown).

In this embodiment, the magnetic flux cross-section area 14a1 of the first lateral post 14a and the magnetic flux cross-section area 14b1 of the second lateral post 14b are identical. The first magnetic path 1a is the same as the second magnetic path 1b. The first winding coil assembly 15a and the second winding coil assembly 15b have the same turn numbers. The first inductor $L_1$ and the second inductor $L_2$ have the same inductance values.

FIG. 2 is a schematic circuit diagram illustrating a multi-loop power factor correction circuit having an integrated multi-inductor magnetic member according to an embodiment of the present invention. As shown in FIG. 2, the multi-loop power factor correction circuit comprises an integrated multi-inductor magnetic member 1, a first rectifier circuit 2, a first switching circuit 3a, a second switching circuit 3b, a first diode $D_1$ (first rectifying element), a second diode $D_2$ (second rectifying element) and a power factor correction controlling circuit 4. By the first rectifier circuit 2, an input AC voltage $V_{in}$ is rectified into a rectified voltage $V_r$. The integrated multi-inductor magnetic member 1 comprises a first inductor $L_1$ and a second inductor $L_2$. A first terminal of the first inductor $L_1$ and a first terminal of the second inductor $L_2$ are connected to the positive output terminal of the first rectifier circuit 2. A second terminal of the first inductor $L_1$ and a second terminal of the second inductor $L_2$ are respectively connected to a first connecting node $K_1$ and a second connecting node $K_2$.

The first switching circuit 3a is connected to the first connecting node $K_1$. The second switching circuit 3b is connected to the second connecting node $K_2$. The anode of the first diode $D_1$ is connected to the first connecting node $K_1$. The cathode of the first diode $D_1$ is connected to a power output terminal $B_1$. The anode of the second diode $D_2$ is connected to the second connecting node $K_2$. The cathode of the second diode $D_2$ is connected to the power output terminal $B_1$. The power factor correction controlling circuit 4 is connected to a common terminal COM, the positive output terminal of the first rectifier circuit 2, the power output terminal $B_1$, the control terminal of the first switching circuit 3a and the control terminal of the second switching circuit 3b. Under control of the power factor correction controlling circuit 4, the first switching circuit 3a and the second switching circuit 3b are alternately conducted.

In this embodiment, the multi-loop power factor correction circuit further comprises a first current-detecting circuit 5a, a second current-detecting circuit 5b and an output capacitor $C_o$. The output capacitor $C_o$ is interconnected between the power output terminal $B_1$ and the common terminal COM. The first current-detecting circuit 5a is connected to the first switching circuit 3a and the common terminal COM. That is, the first current-detecting circuit 5a is serially connected to the first switching circuit 3a. The second current-detecting circuit 5b is connected to the second switching circuit 3b and the common terminal COM. That is, the second current-detecting circuit 5b is serially connected to the second switching circuit 3b. In this embodiment, the first current-detecting circuit 5a and the second current-detecting circuit 5b are a first detecting resistor $R_{s1}$ and a second detecting resistor $R_{s2}$, respectively.

In this embodiment, the multi-loop power factor correction circuit is two-loop circuit. A first loop is defined by the first inductor $L_1$ and the first switching circuit 3a. A second loop is defined by the second inductor $L_2$ and the second switching circuit 3b. That is, the first inductor $L_1$ and the second inductor $L_2$ are respectively included in the first loop and the second loop of the multi-loop power factor correction circuit. When the first switching circuit 3a is conducted, the first inductor $L_1$ is in a charging status, and the magnitude of a first current $I_1$ flowing through the first inductor $L_1$ increases. The first current $I_1$ flows to the first current-detecting circuit 5a through the first switching circuit 3a. As such, the first current-detecting circuit 5a generates a first current-detecting signal $V_{s1}$. Meanwhile, the second switching circuit 3b is shut off, the second inductor $L_2$ is in a discharging status, and the magnitude of the second current $I_2$ decreases. As such, the second current $I_2$ flows to the output capacitor $C_o$ through the second diode $D_2$.

Similarly, when the second switching circuit 3b is conducted, the second inductor $L_2$ is in a charging status, and the magnitude of the second current $I_2$ increases. The second current $I_2$ flows to the second current-detecting circuit 5b through the second switching circuit 3b. As such, the second current-detecting circuit 5b generates a second current-detecting signal $V_{s2}$. Meanwhile, the first switching circuit 3a is shut off, the first inductor $L_1$ is in a discharging status, and the magnitude of the first current $I_1$ decreases. As such, the first current $I_1$ flows to the output capacitor $C_o$ through the first diode $D_1$.

In this embodiment, the power factor correction controlling circuit 4 comprises an input waveform-detecting circuit 41, a feedback circuit 42 and a power factor correction (PFC) controller 43. The input waveform-detecting circuit 41 comprises a first resistor $R_A$, a second resistor $R_B$ and a first capacitor $C_1$. The feedback circuit 42 comprises a third resistor $R_C$ and a fourth resistor $R_D$. The first resistor $R_A$ is interconnected between the positive output terminal of the first rectifier circuit 2 and a first voltage-division terminal $K_a$. The second resistor $R_B$ is interconnected between the first voltage-division terminal $K_a$ and the common terminal COM. The first capacitor $C_1$ is also interconnected between the first voltage-division terminal $K_a$ and the common terminal COM. In the input waveform-detecting circuit 41, a first voltage division circuit is defined by the first resistor $R_A$, the second resistor $R_B$ and the first capacitor $C_1$. The first voltage division circuit may filter off the high-frequency noise contained in the rectified voltage $V_r$, thereby generating an input detecting signal $V_{ra}$. The waveform of the input detecting signal $V_{ra}$ is the same as the waveform of the rectified voltage $V_r$. The third resistor $R_C$ is interconnected between the power output terminal $B_1$ and a second voltage-division terminal $K_b$. The fourth resistor $R_D$ is interconnected between the second voltage-division terminal $K_b$ and the common terminal COM. In the feedback circuit 42, a second voltage division circuit is defined by the third resistor $R_C$ and the fourth resistor $R_D$. The output DC voltage $V_{DC}$ is subject to voltage division by the second voltage division circuit, thereby generating a feedback signal $V_f$.

In other words, the waveform of the input AC voltage $V_{in}$ is acquired by the power factor correction controller 43 according to the input detecting signal $V_{ra}$. According to the feedback signal $V_f$, the power factor correction controller 43 could discriminate whether the output DC voltage $V_{DC}$ is maintained at the rated voltage value. According to the first current-detecting signal $V_{s1}$ and the second current-detecting signal $V_{s2}$, the relation between the first current $I_1$ and the second current $I_2$ is detected by the power factor correction controller 43 so as to control the duty cycles of the first switching circuit 3a and the second switching circuit 3b. As a consequence, the output DC voltage $V_{DC}$ is maintained at the rated voltage value, and the distribution of the input AC current $I_{in}$ is similar to the waveform of the input AC voltage $V_{in}$. In other words, the envelop curve of an input AC current $I_{in}$ is similar to the waveform of the input AC voltage $V_{in}$. Under this circumstance, a better power factor correction function is achieved.

Figure 3:
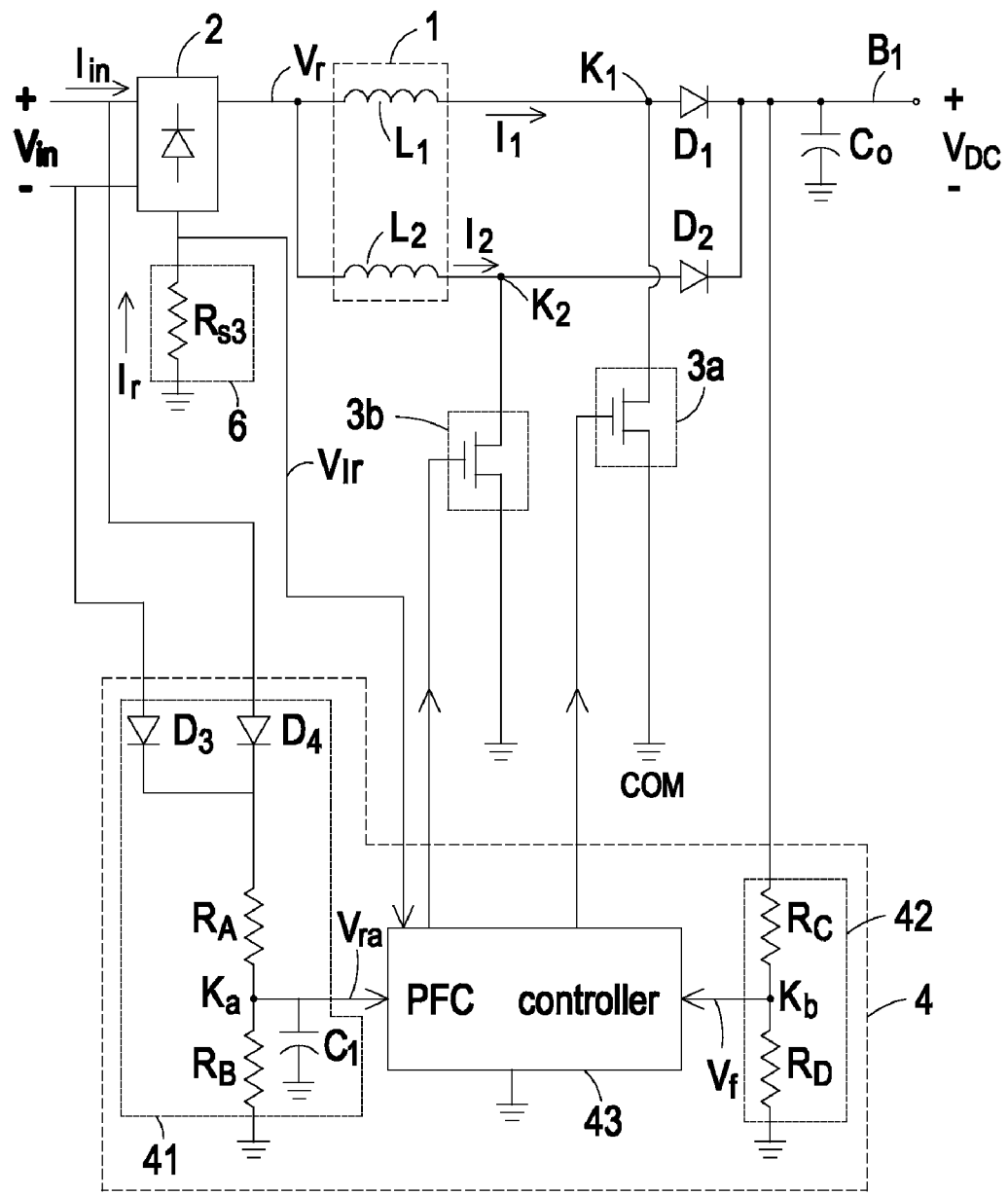
FIG. 3 is a schematic circuit diagram illustrating a multi-loop power factor correction circuit having an integrated multi-inductor magnetic member according to another embodiment of the present invention.

FIG. 3 is a schematic circuit diagram illustrating a multi-loop power factor correction circuit having an integrated multi-inductor magnetic member according to another embodiment of the present invention. In comparison with FIG. 2, the multi-loop power factor correction circuit of FIG. 3 further comprises a rectifying current-detecting circuit 6, the first current-detecting circuit 5a and the second current-detecting circuit 5b are not included, and the configurations of the input waveform-detecting circuit 41 is distinguished. As shown in FIG. 3, the rectifying current-detecting circuit 6 is interconnected between the negative output terminal of the first rectifier circuit 2 and the common terminal COM. The rectified current-detecting circuit 6 is used for detecting a rectified current $I_r$, thereby generating a corresponding rectified current-detecting signal $V_{Ir}$. In this embodiment, the rectified current-detecting circuit 6 includes a third detecting resistor $R_{s3}$. When the first switching circuit 3a or the second switching circuit 3b is conducted or shut off, the magnitude of the first inductor $L_1$ or the second inductor $L_2$ is increased or decreased. As the magnitude of the first inductor $L_1$ or the second inductor $L_2$ is changed, the rectified current $I_r$ and the rectified current-detecting signal $V_{Ir}$ are changed.

In this embodiment, input waveform-detecting circuit 41 comprises a first resistor $R_A$, a second resistor $R_B$, a first capacitor $C_1$, a third diode $D_3$ and a fourth diode $D_4$. A first voltage division circuit is defined by the first resistor $R_A$, the second resistor $R_B$ and the first capacitor $C_1$. A second rectifier circuit is defined by the third diode $D_3$ and the fourth diode $D_4$. The anodes of the third diode $D_3$ and the fourth diode $D_4$ are connected to the two input terminals of the first rectifier circuit 2. The cathodes of the third diode $D_3$ and the fourth diode $D_4$ are connected to the input terminal of the first voltage division circuit. In the input waveform-detecting circuit 41, the input voltage is rectified by the second rectifier circuit and then the high-frequency noise is filtered off by the first voltage division circuit, so that the input detecting signal $V_{ra}$ is generated.

In other words, the waveform of the input AC voltage $V_{in}$ is acquired by the power factor correction controller 43 according to the input detecting signal $V_{ra}$. According to the feedback signal $V_f$, the power factor correction controller 43 could discriminate whether the output DC voltage $V_{DC}$ is maintained at the rated voltage value. According to the rectified current-detecting signal $V_{Ir}$, the relation between the first current $I_1$ and the second current $I_2$ is detected by the power factor correction controller 43 so as to control the duty cycles of the first switching circuit 3a and the second switching circuit 3b. As a consequence, the output DC voltage $V_{DC}$ is maintained at the rated voltage value, and the distribution of the input AC current is similar to the waveform of the input AC voltage $V_{in}$. In other words, the envelop curve of an input AC current is similar to the waveform of the input AC voltage $V_{in}$. Under this circumstance, a better power factor correction function is achieved.

In the above embodiments, each of the first switching circuit 3a and the second switching circuit 3b includes one or more switch elements. Examples of the switch elements include but are not limited to metal oxide semiconductor field effect transistors (MOSFETs), bipolar junction transistors (BJTs) or insulated gate bipolar transistors (IGBT). For example, the first switching circuit 3a includes a MOSFET and the second switching circuit 3b includes a MOSFET. The first rectifier circuit 2 and the second rectifier circuit are bridge-types rectifier circuits. In addition, the power factor correction controlling circuit 4 is a controller, a micro controller unit (MCU) or a digital signal processor (DSP).

Figure 4:
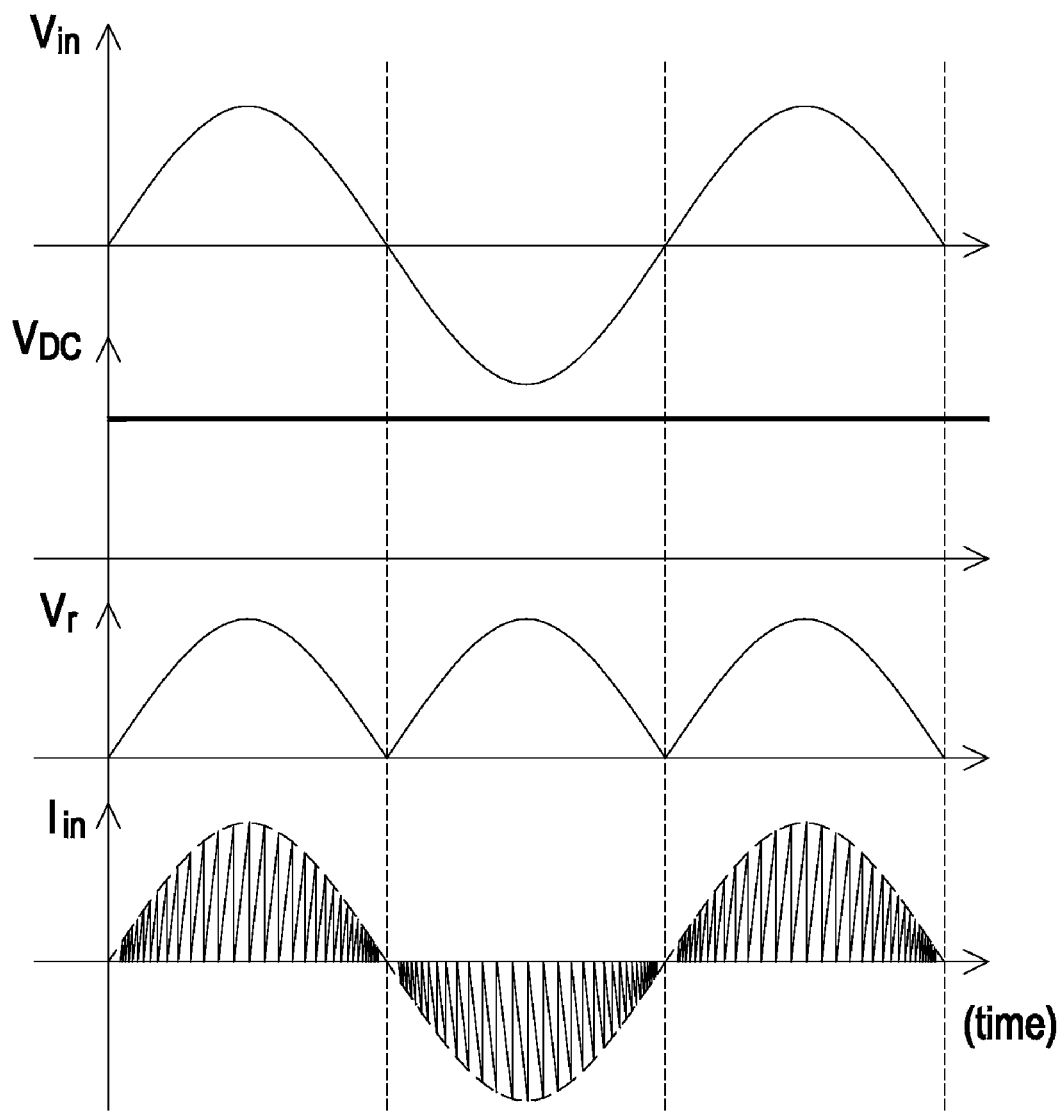
FIG. 4 is a timing waveform diagram schematically illustrating related voltage signals and current signals described in the multi-loop power factor correction circuit of FIG. 2 or FIG. 3.

FIG. 4 is a timing waveform diagram schematically illustrating related voltage signals and current signals described in the multi-loop power factor correction circuit of FIG. 2 or FIG. 3. Since the first switching circuit 3a or the second switching circuit 3b is conducted or shut off under control of the power factor correction controlling circuit 4, the waveform of the input AC current $I_{in}$ is altered such that the envelop curve of an input AC current is similar to the waveform of the input AC voltage $V_{in}$. Under this circumstance, a better power factor correction function is achieved.

From the above description, the integrated multi-inductor magnetic member and the multi-loop power factor correction circuit of the present invention may be applied to a high-power electronic device. Since the first inductor and the second inductor of the integrated multi-inductor magnetic member are alternately charged, the utilization of the electronic component is enhanced. In addition, since the number of electronic components is reduced, the overall volume of the electronic device is decreased. Since the magnetic flux cross-section area of the middle post is smaller than the sum of the magnetic flux cross-section areas of the lateral posts, the volume of the integrated multi-inductor magnetic member is reduced and the eddy loss is decreased even if the inductance value is kept unchanged. Generally, the volume of the integrated multi-inductor magnetic member is relatively larger than other electronic components. Accordingly, the reduction of the integrated multi-inductor magnetic member is helpful for minimization of the electronic device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-loop power factor correction circuit comprising:
a first rectifier circuit for rectifying an input AC voltage into a rectified voltage;
an integrated multi-inductor magnetic member comprising a first slab, a second slab, a middle post between said first slab and said second slab, plural lateral posts between said first slab and said second slab, and plural winding coil assemblies, wherein said winding coil assemblies are wound around respective lateral posts to form at least a first inductor and a second inductor, a first terminal of said first inductor and a first terminal of said second inductor are connected to said first rectifier circuit, a second terminal of said first inductor and a second terminal of said second inductor are respectively connected to a first connecting node and a second connecting node, and the magnetic flux cross-section area of said middle post is smaller than the sum of the magnetic flux cross-section areas of said lateral posts;
plural switching circuits comprising at least a first switching circuit and a second switching circuit, wherein said first switching circuit and said second switching circuit are respectively connected to said first connecting node and said second connecting node;
plural rectifying elements comprising at least a first rectifying element and a second rectifying element, wherein said first rectifying element is interconnected between said first connecting node and a power output terminal, and said second rectifying element is interconnected between said second connecting node and said power output terminal; and
a power factor correction controlling circuit connected to a common terminal, said first rectifier circuit and control terminals of said switching circuits, wherein said switching circuits are alternately conducted, so that the distribution of an input AC current is similar to the waveform of said input AC voltage.

2. The multi-loop power factor correction circuit according to claim 1 wherein the magnetic flux cross-section area of each of said lateral posts and the magnetic flux cross-section area of said middle post are identical.

3. The multi-loop power factor correction circuit according to claim 1 wherein the magnetic flux cross-section area of said middle post is 1~1.2 times of the magnetic flux cross-section area of each of said lateral posts.

4. The multi-loop power factor correction circuit according to claim 1 wherein the distances of said lateral posts relative to said middle post are identical.

5. The multi-loop power factor correction circuit according to claim 1 wherein said plural lateral posts comprises a first lateral post and a second lateral post, and a first magnetic path defined by a portion of said first slab, a portion of said second slab, said middle post and said first lateral post is the same as a second magnetic path defined by a portion of said first slab, a portion of said second slab, said middle post and said second lateral post.

6. The multi-loop power factor correction circuit according to claim 1 wherein said first slab, said second slab, said middle post and said lateral posts are assembled into a magnetic core assembly.

7. The multi-loop power factor correction circuit according to claim 1 wherein said plural lateral posts comprises a first lateral post and a second lateral post, and each of said middle post, said first lateral post and said second lateral post comprises an upper portion and a lower portion, wherein said upper portion of said middle post, said upper portion of said first lateral post, said upper portion of said second lateral post and said first slab are integrated into a first magnetic core, and said lower portion of said middle post, said lower portion of said first lateral post, said lower portion of said second lateral post and said second slab are integrated into a second magnetic core.

8. The multi-loop power factor correction circuit according to claim 1 wherein said plural winding coil assemblies have the same turn number.

9. The multi-loop power factor correction circuit according to claim 1 wherein said plural inductors have the same inductance value.

10. The multi-loop power factor correction circuit according to claim 1 wherein each of said winding coil assemblies is produced by winding a flat copper coil or a circular copper coil, which has been subject to surface insulation treatment.

11. The multi-loop power factor correction circuit according to claim 1 further comprising an output capacitor, which is interconnected between said power output terminal and said common terminal.

12. The multi-loop power factor correction circuit according to claim 1 wherein said power factor correction controlling circuit comprises:
    an input waveform-detecting circuit connected to said first rectifier circuit for generating an input detecting signal having the same waveform as said rectified voltage;
    a feedback circuit for generating a feedback signal according to an output DC voltage that is outputted from said power output terminal; and
    a power factor correction controller for controlling said plural switching circuits to be alternately conducted or shut off according to said feedback signal and said input detecting signal, so that the distribution of said input AC current is similar to the waveform of said input AC voltage.

13. The multi-loop power factor correction circuit according to claim 12 further comprising:
    a first current-detecting circuit connected to said first switching circuit for detecting a first current flowing in said first inductor, thereby generating a first current-detecting signal; and
    a second current-detecting circuit connected to said second switching circuit for detecting a second current flowing in said second inductor, thereby generating a second current-detecting signal.

14. The multi-loop power factor correction circuit according to claim 13 wherein according to said first current-detecting signal and said second current-detecting signal, said power factor correction controller discriminates a relation between said first current and said second current to control duty cycles of said first switching circuit and said second switching circuit, so that said output DC voltage is maintained at a rated voltage value and the distribution of said input AC current is similar to the waveform of said input AC voltage.

15. The multi-loop power factor correction circuit according to claim 14 wherein said first current-detecting circuit and said second current-detecting circuit are respectively a first detecting resistor and a second detecting resistor.

16. The multi-loop power factor correction circuit according to claim 12 wherein said input waveform-detecting circuit and said feedback circuit are voltage division circuits.

17. The multi-loop power factor correction circuit according to claim 12 wherein said input waveform-detecting circuit comprises:
    a second rectifier circuit connected to an input terminal of said first rectifier circuit for rectification; and
    a voltage division circuit connected to said second rectifier circuit and said power factor correction controller for performing voltage division and filtering high-frequency noise, thereby generating said input detecting signal.

18. The multi-loop power factor correction circuit according to claim 1 further comprising a rectified current-detecting circuit interconnected between a negative output terminal of said first rectifier circuit and said common terminal for detecting a rectified current, thereby generating a corresponding rectified current-detecting signal, wherein according to said rectified current-detecting signal, said power factor correction controlling circuit discriminates a relation between the currents flowing in said first inductor and said second inductor to control duty cycles of said first switching circuit and said second switching circuit, so that the distribution of said input AC current is similar to the waveform of said input AC voltage.

19. The multi-loop power factor correction circuit according to claim 1 further comprising a first loop and a second loop, wherein said first inductor is included in said first loop, said second inductor is included in said second loop, and said first inductor and said second inductor are alternately charged during operation of said multi-loop power factor correction circuit.

20. An integrated multi-inductor magnetic member for use in a multi-loop power factor correction circuit, said integrated multi-inductor magnetic member comprising:
    a first slab;
    a second slab;
    a middle post arranged between said first slab and said second slab;
    plural lateral posts arranged between said first slab and said second slab, wherein the magnetic flux cross-section area of said middle post is smaller than the sum of the magnetic flux cross-section areas of said lateral posts; and
    plural winding coil assemblies wound around respective lateral posts to form at least a first inductor and a second inductor, wherein said first inductor and said second inductor are respectively included in a first loop and second loop of said multi-loop power factor correction circuit, and said first inductor and said second inductor are alternately charged during operation of said multi-loop power factor correction circuit.

* * * * *